US012069659B2

(12) United States Patent
Thubert et al.

(10) Patent No.: US 12,069,659 B2
(45) Date of Patent: Aug. 20, 2024

(54) CLIENT-CONTROLLED COMMUNICATION SCHEDULING WITH AN OVERHEAD MESH OF ACCESS POINTS

(71) Applicant: Cisco Technology, Inc., San Jose, CA (US)

(72) Inventors: Pascal Thubert, Roquefort les Pins (FR); Alessandro Erta, Licciana Nardi (IT); Amine Choukir, Lausanne (CH); Domenico Ficara, Essertines-sur-Yverdon (CH); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 17/581,136

(22) Filed: Jan. 21, 2022

(65) Prior Publication Data
US 2023/0239871 A1    Jul. 27, 2023

(51) Int. Cl.
| | |
|---|---|
| *H04W 72/1273* | (2023.01) |
| *H04L 67/568* | (2022.01) |
| *H04W 16/28* | (2009.01) |
| *H04W 84/18* | (2009.01) |

(52) U.S. Cl.
CPC ....... *H04W 72/1273* (2013.01); *H04L 67/568* (2022.05); *H04W 16/28* (2013.01); *H04W 84/18* (2013.01)

(58) Field of Classification Search
CPC . H04W 72/1273; H04W 16/28; H04W 84/18; H04W 72/046; H04L 67/568
See application file for complete search history.

(56) References Cited

U.S. PATENT DOCUMENTS

| | | | |
|---|---|---|---|
| 9,769,708 B2 | 9/2017 | Bisti et al. | |
| 10,735,924 B2 | 8/2020 | Thubert et al. | |
| 10,932,281 B2* | 2/2021 | Kim | H04L 43/045 |
| 11,956,162 B2* | 4/2024 | Sherman | H04L 7/0008 |

(Continued)

FOREIGN PATENT DOCUMENTS

WO    2020104288    5/2020

OTHER PUBLICATIONS

"Wi-Fi 6 BSS Coloring and Spatial Reuse WhitePaper", online: https://www.cisco.com/c/en/us/products/collateral/wireless/white-paper-c11-743702.html, May 11, 2020, 9 pages, Cisco.com.

(Continued)

*Primary Examiner* — Afshawn M Towfighi
(74) *Attorney, Agent, or Firm* — BEHMKE INNOVATION GROUP LLC; James M. Behmke; James J. Wong

(57) ABSTRACT

In one embodiment, a client device enters an area having an overhead mesh of access points, each access point comprising one or more directional transmitters each configured to transmit a beam cone in a substantially downward direction towards a floor of the area. The client device obtains an area-dependent communication schedule for the overhead mesh that is exclusive or partially-exclusive to the client device for the area. The client device sends, during an arbitrary timeslot of the area-dependent communication schedule, a pull request. The client device receives, from a particular access point in the overhead mesh, a packet in response to the pull request.

20 Claims, 9 Drawing Sheets

(56) References Cited

U.S. PATENT DOCUMENTS

2021/0119743 A1  4/2021  Van Wageningen
2021/0144565 A1  5/2021  Cizdziel et al.

OTHER PUBLICATIONS

Guizzo, Erico, "Kiva Systems: Three Engineers, Hundreds of Robots, One Warehouse", online: https://spectrum.ieee.org/three-engineers-hundreds-of-robots-one-warehouse#toggle-gdpr, Jul. 2, 2008, 9 pages, IEEE Spectrum.
"Li-Fi", online: https://en.wikipedia.org/wiki/Li-Fi, Dec. 24, 2021, accessed Jan. 3, 2022, 8 pages, Wikimedia Foundation, Inc.
"LoRa", online: https://en.wikipedia.org/wiki/LoRa, Dec. 6, 2021, accessed Jan. 3, 2022, 4 pages, Wikimedia Foundation, Inc.
"Time Slotted Channel Hopping", online: https://en.wikipedia.org/wiki/Time_Slotted_Channel_Hopping, 3 pages, Dec. 17, 2021, accessed Jan. 3, 2022, Wikimedia Foundation, Inc.
Dolnak, et al., "Using IPv6 protocol in V2X networks based on IEEE 802.11-OCB mode of operation", Proc. of the 2nd International Conference on Electrical, Communication and Computer Engineering (ICECCE), 4 pp. Jun. 12-13, 2020, Istanbul, Turkey.
"5G Terminology: The gNB", online: https://www.5g-networks.net/5g-technology/5g-terminology-the-gnb/, May 24, 2019, 2 pages.
"IEEE 802.11p", online: https://en.wikipedia.org/wiki/IEEE_802.11p, Nov. 26, 2021, 3 pages, Wikimedia Foundation, Inc.
"Directional Antenna", online: https://en.wikipedia.org/wiki/Directional_antenna, Nov. 1, 2021, 4 pages, the Wikimedia Foundation, Inc.

\* cited by examiner

| | T1 | T2 | T3 |
|---|---|---|---|
| AP Group 1 | Yellow Client Device | Orange Client Device | Purple Client Device |
| AP Group 2 | Purple Client Device | Yellow Client Device | Orange Client Device |
| AP Group 3 | Orange Client Device | Purple Client Device | Yellow Client Device |

FIG. 8

CLIENT-CONTROLLED COMMUNICATION SCHEDULING WITH AN OVERHEAD MESH OF ACCESS POINTS

TECHNICAL FIELD

The present disclosure relates generally to computer networks, and, more particularly, to client-controlled communication scheduling with an overhead mesh of access points.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. In other words, the IoT has expanded to include many operational technology (OT) networks, as well.

Traditionally, many OT networks have relied on wired networking solutions. This is primarily due to the potential for error, should a wireless solution be adopted. For instance, consider the case of a factory. Any errors in the wireless communications in such a setting could disrupt the manufacturing process (e.g., a by failing to provide a control command to an actuator, by failing to provide sensor data to a controller, etc.).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example of area-dependent communication schedules for a particular area.

DESCRIPTION OF EXAMPLE EMBODIMENTS

Overview

Figure 1:
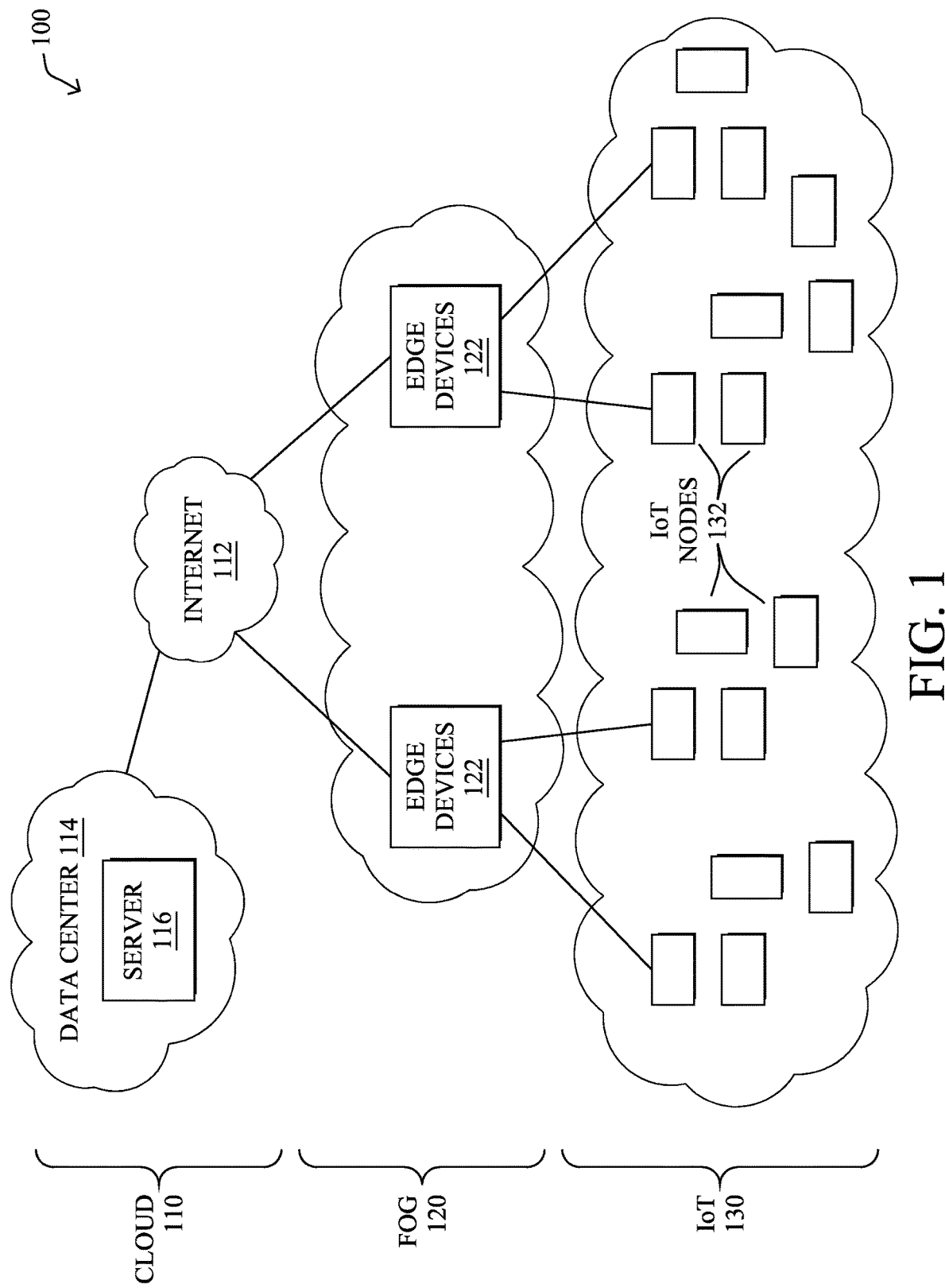
FIG. 1 illustrate an example network.

According to one or more embodiments of the disclosure, a client device enters an area having an overhead mesh of access points, each access point comprising one or more directional transmitters each configured to transmit a beam cone in a substantially downward direction towards a floor of the area. The client device obtains an area-dependent communication schedule for the overhead mesh that is exclusive or partially-exclusive to the client device for the area. The client device sends, during an arbitrary timeslot of the area-dependent communication schedule, a pull request. The client device receives, from a particular access point in the overhead mesh, a packet in response to the pull request.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
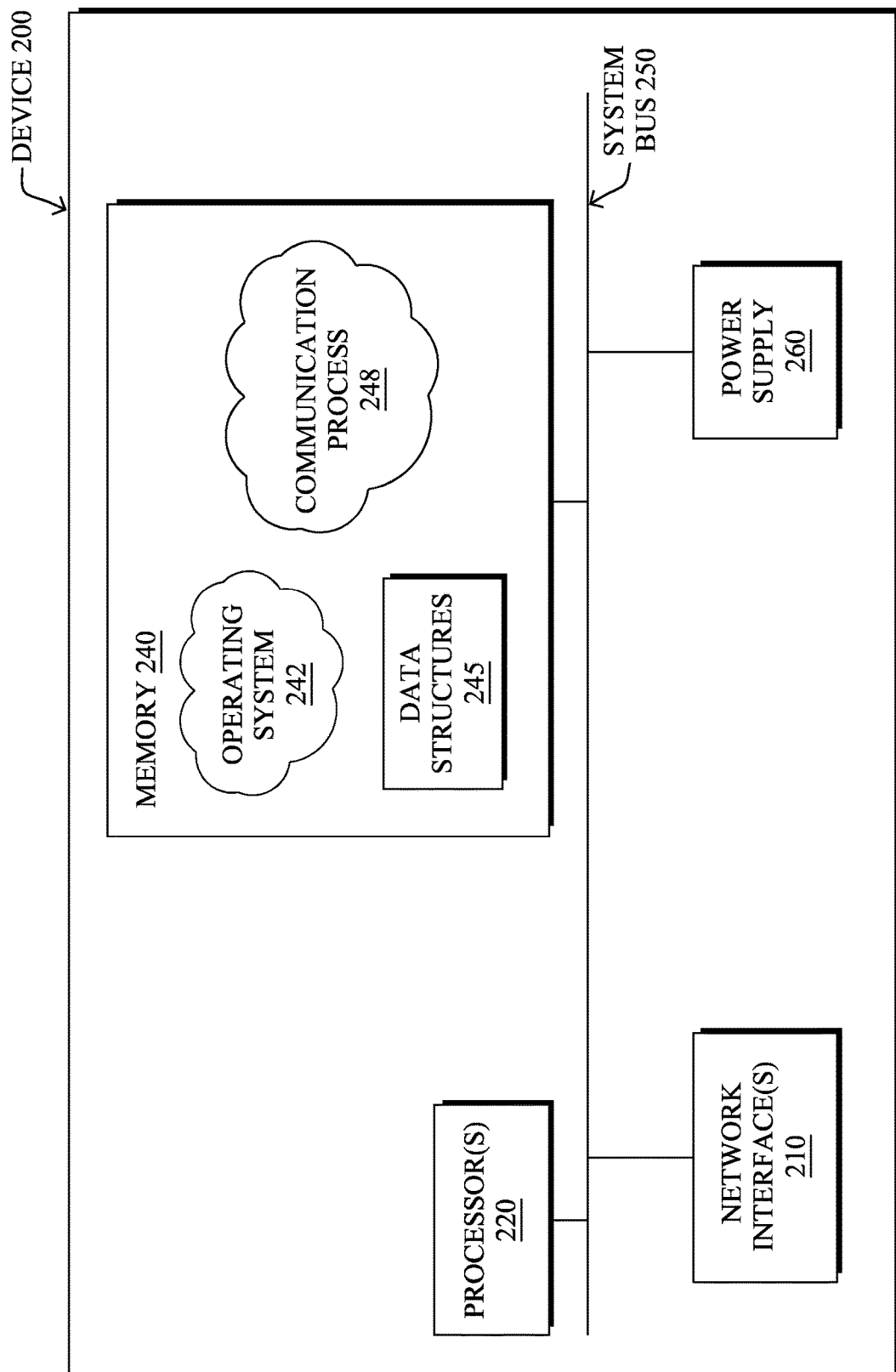
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below (e.g., a client device, an access point, a network controller, etc.). The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
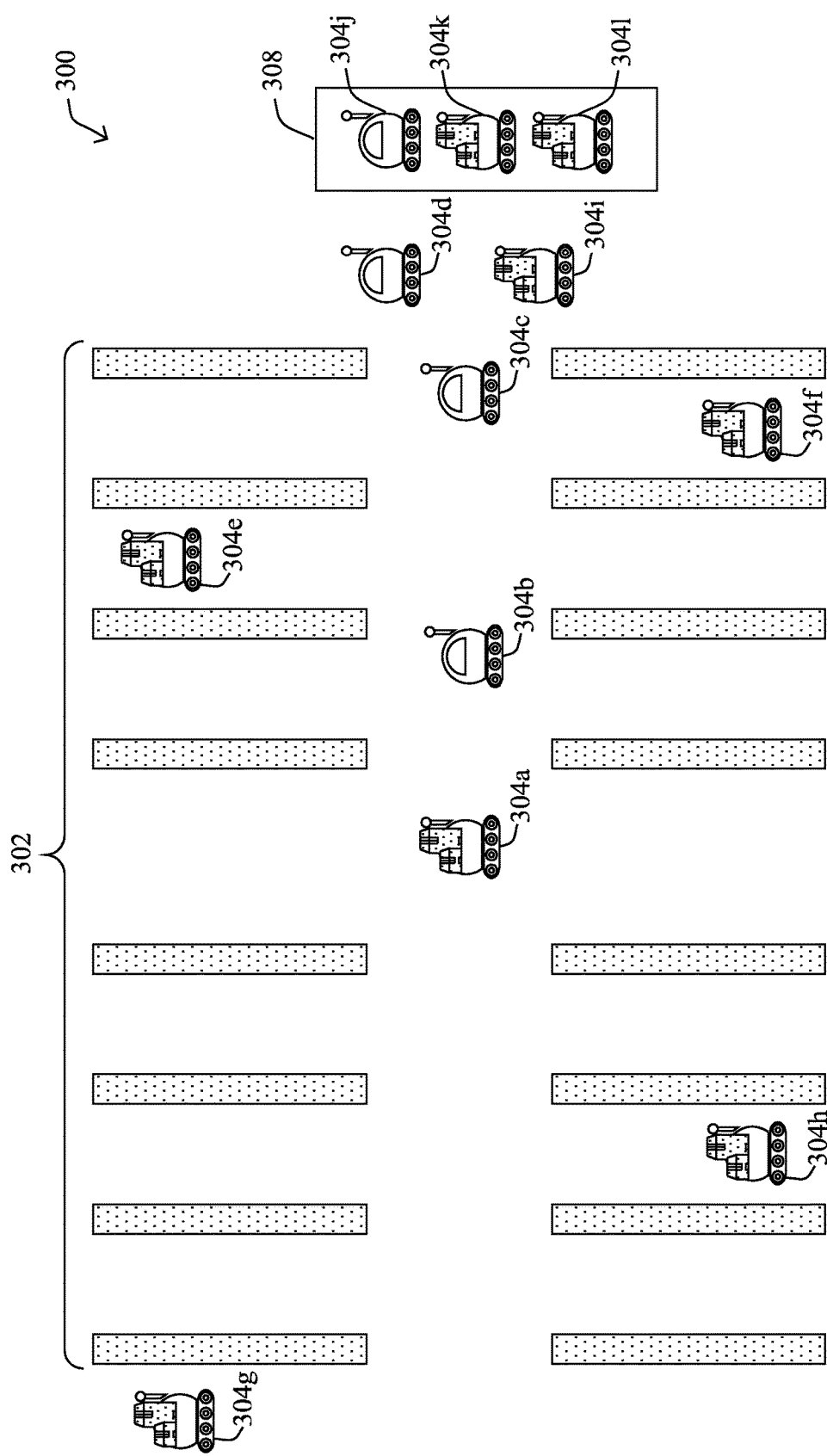
FIG. 3 illustrates an example industrial wireless network deployed in a warehouse.

FIG. 3 illustrates an example warehouse 300. As shown, assume that a plurality of inventory racks 302 are distributed throughout warehouse 300 for purposes of storing items. As would be appreciated, inventory racks 302 are optional and other forms of storage systems may be deployed throughout warehouse 300, in other cases. For instance, warehouse 300 may also include containers, holding pens, or the like, in which various items may be stored.

To aid in the storage and/or retrieval of the items in the warehouse, any number of mobile robots 304 may be deployed, such as mobile robots 302a-3041 shown. In general, each mobile robot 304 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 304 may also include mechanisms to automatically load and/or unload items, such as forklifts, mechanical claws, or the like. In other embodiments, mobile robots 304 may require the assistance of human workers to load and unload items to and from them, such as at a pack-out area 308.

In some instances, mobile robots 304 may be partially or fully autonomous, allowing them to complete their tasks, independently. For instance, a particular mobile robot 304 may be sent a task list that indicates the set of items that the robot is to retrieve from within warehouse 300, navigation information if so needed, or any other information that may be required for the performance of its retrieval functions.

As noted above, operational technology (OT) networks have traditionally favored wired networking techniques, due to their perceived reliability over wireless approaches. Indeed, if a wireless communication is lost or delayed in an industrial setting, it could disrupt the manufacturing (or other) process that is being controlled. However, as the IoT expands into these settings, the use of wireless networking often becomes unavoidable, such as in the case of mobile devices (e.g., mobile robots 304 in FIG. 3). Current approaches, however, still need to contend with issues such as the speed of roaming supported by the network, shelving masking the wireless signals, and the like.

There are also some efforts to adapt Time Sensitive Networking (TSN) to both 5G and 802.11, to support wireless OT deployments. In both cases, the adaptation adds complexity over the already complex set of standards, making them even harder to understand and operate, and ultimately to have confidence in the solution. Confidence, in fact, is the core requirement in OT networking as it allows one to understand and make assumptions on its behavior. In 5G and 802.11, the adaptation builds on the existing peer-to-peer P2P relationship between a client/station (STA)/user equipment (UE) and an access point (AP)/base station (BS)/gNB, respectively. Note that the terminology varies by wireless protocol and the terms "client" and "AP" are used herein for purposes of simplicity, without limiting the techniques herein to a specific protocol. Regardless, these efforts still require the establishment of a wireless association between a client and AP, which can naturally slow down the roaming process, as well as preventing the use of multi-point to multi-point (MP2MP) radio connectivity.

Client-Controlled Communication Scheduling with an Overhead Mesh of APs

The techniques introduced herein allow a client device to communicate wirelessly through the use of an overhead mesh of access points. In some aspects, non-overlapping or semi-overlapping, time-slotted channel-hopping (TSCH) communication schedules may be assigned to client devices for use in a particular area having an overhead mesh of APs. In another aspect, such a communication schedule may be client-controlled, thereby allowing the client to decide when to receive communications from the mesh and/or transmit to the mesh. This client-controlled communication scheduling also supports associationless communications with the overhead mesh, meaning that the client device does not need to perform an association exchange with any particular AP in the mesh, prior to sending packets to that AP. Further aspects of the techniques herein also introduce mechanisms to ensure that client devices avoids interfering with other client devices having overlapping schedules.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Specifically, in various embodiments, a client device enters an area having an overhead mesh of access points, each access point comprising one or more directional transmitters each configured to transmit a beam cone in a substantially downward direction towards a floor of the area.

The client device obtains an area-dependent communication schedule for the overhead mesh that is exclusive or partially-exclusive to the client device for the area. The client device sends, during an arbitrary timeslot of the area-dependent communication schedule, a pull request. The client device receives, from a particular access point in the overhead mesh, a packet in response to the pull request.

Figure 4B:
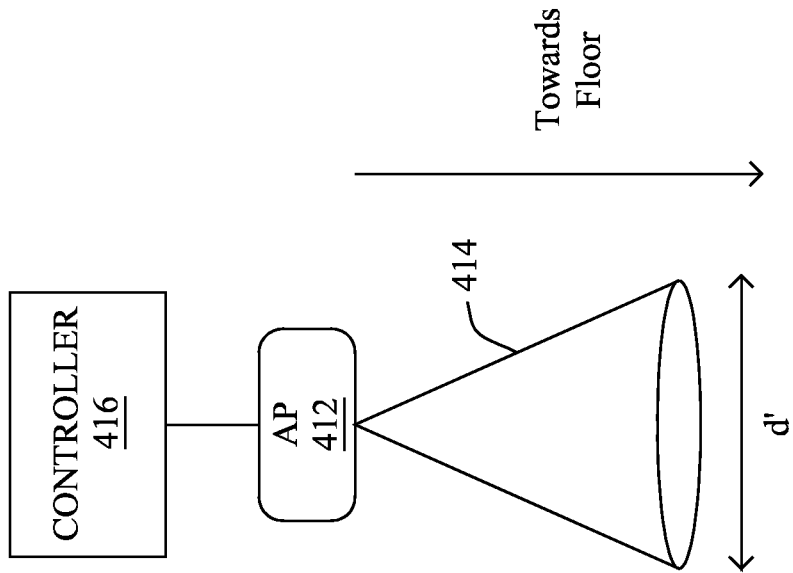
FIGS. 4A-4B illustrate example radiation patterns by nodes of a wireless network.
Figure 4A:
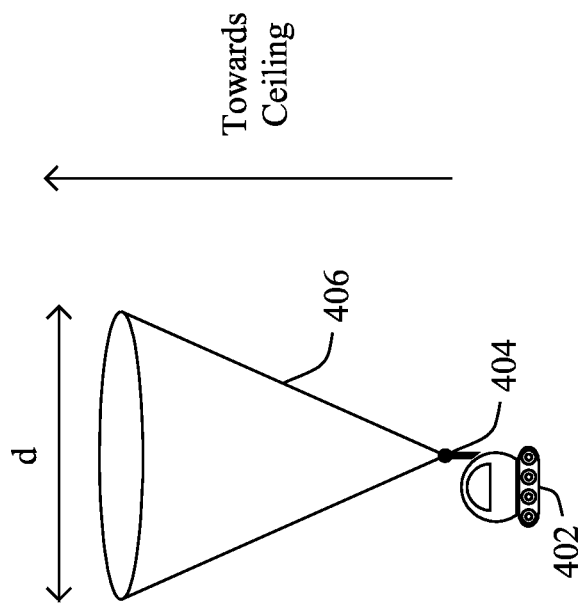

Operationally, FIGS. 4A-4B illustrate example radiation patterns by nodes of a wireless network, according to various embodiments. As shown in FIG. 4A, a client device 402, such as a mobile robot 304 in FIG. 3, a stationary device, or any other wireless client requiring connectivity, may include a transceiver or transceiver that comprises a directional antenna 404 that is pointed substantially upward relative to client device 402. For instance, in the case of a warehouse, factory, or the like, directional antenna 404 may be pointed substantially towards the ceiling of the building.

In general, a defining characteristic of directional antenna 404 is that its radiation pattern will exhibit significantly higher gain in the upward direction than in its lateral directions. As would be appreciated, this can help to prevent client device 402 from interfering with any other nearby client devices, as its transmissions are directed substantially upward. Example directional antennas that may be suitable for use as directional antenna 404 may include, but are not limited to, Yagi antennas, log-periodic antennas, corner reflector antennas, phased array antennas, and the like. For instance, in the case of directional antenna 404 including multiple radiating elements, client device 402 may use beamforming to direct its transmissions substantially upward (e.g., near, or precisely, perpendicular to the floor of the area).

As a result of the operation of directional antenna 404, any wireless transmission from client device 402 will take the form of a beam cone 406 that exhibits a diameter d when it comes in contact with the overhead mesh of access points above client device 402. Note that even in the case of extremely tight beam patterns, divergence effects will cause the transmissions to exhibit an increased diameter as the distance increases, thereby taking on a cone-like pattern.

FIG. 4B illustrates an example access point of the overhead mesh of access points introduced herein, according to various embodiments. As shown, access point (AP) 412 may use a similar approach as that of client device 402 to direct its transmissions, but in the opposite direction towards the floor of the area. Thus, AP 412 may include a directional antenna that sends communications from AP 412 that may take the form of a beam cone 414 having a diameter d' at the floor of the area or at a predefined height relative to the floor.

To prevent energy leafage between cones (e.g., between the beam cones of different APs, different client devices, etc.), the energy differential may be sufficient to eliminate the parasite signal, such as by the receiving device. This is true also for a signal that will rebound multiple times and be attenuated by distance and diffusion/spreading on a reflective surface that is not flat. In other instances, the sending device (e.g., client device 402, AP 412, etc.) may also be equipped with shielding that can absorb whatever energy is not perfectly radiated in the cone, in some embodiments.

In various embodiments, AP 412 may be controlled by a controller 416 that oversees the operation of the entire set of APs in the overhead mesh or a portion thereof. In some embodiments, controller 416 may compute and provide a communication schedule to AP 412. Such a communication schedule may control when AP 412 is to transmit data towards the floor of the area and/or listen for any messages transmitted upward towards the mesh of overhead APs. In a further instance, the communication schedule sent to AP 412 by controller 416 may also dictate the wavelengths/channels on which AP 412 is to communicate.

During deployment, overhead APs, such as AP 412, may be placed along the ceiling or other overhead structure, to ensure that there is always at least one AP in the beam cone of a client device. Preferably, there will always be at least two APs within the beam cone of a client device, thereby providing redundancy in case a transmission from the client device is not received by one of them.

In some embodiments, a client device, such as client device 402, may communicate wirelessly with an AP of the overhead mesh, such as AP 412, without having to first perform an association exchange with it. As would be appreciated, such exchanges typically entail a discovery phase, an authentication phase, and a final association phase. During the discovery phase, the client device and the AP first discover one another, wirelessly. This is often achieved by the AP sending out a beacon signal, the client device sending a probe request to the AP, and the AP returning a probe response. Such a response allows the client device to determine which AP is the 'best' in terms is of signal strength/received signal strength indicator (RSSI). During the authentication phase, the client device may then send an authentication request to the AP that often includes cryptographic information that allows the network to authenticate the device (e.g., a password to connect to a Wi-Fi network). Finally, once authenticated, the client device may send an association request to the AP to which the AP responds, thereby forming an association between the client device and the specific AP.

Rather than requiring an association exchange with a given AP in the traditional manner, the techniques herein propose that a client device simply register with the controller for the overhead mesh of APs. For instance, client device 402 may register with controller 416. In various embodiments, this registration may also entail client device 402 and controller 416 coordinating the movements of client device 402 over time in the area, either on a pull or push basis. In a fully or semi-autonomous mode of operation of client device 402, for instance, the registration with controller 416 may entail client device 402 or another device in communication therewith providing the movement schedules of client device 402 to controller 416. Alternatively, controller 416 itself may dictate the movement schedule of client device 402 as part of the registration process (e.g., to ensure that client device 402 is not near any other client device when transmitting, to avoid interference). In either case, controller 416 may then generate and provide a communication schedule to client device 402 that may be based in part on the movements of client device 402 over time, in some embodiments.

Since the communications of the client devices and the APs in the overhead mesh are both scheduled by controller 416, there is no need for any given client device to first perform an association exchange with any given AP in the overhead mesh. Instead, any AP in the mesh that receives a transmission from the client device may simply relay the received message onward, such as to controller 416. In the case of multiple APs receiving the same transmission from a client device, controller 416 can then perform deduplication of the redundant messages (e.g., before sending the message on towards its destination, before processing the message locally, etc.).

For instance, client device 402 may simply transmit a message without specifying u) a source and destination media access control (MAC) address, such as by using a broadcast mode of transmission that is received by one or more of the overhead APs in the mesh. Based on the location of the AP(s) that receive a transmission and/or the timing of the transmission, controller 416 can easily identify the sender of the transmission. In other words, the receiving AP(s) in the mesh essentially function as translational relays that do not have to process MAC addresses or any cryptography (e.g., as part of an authentication exchange).

Figure 5:
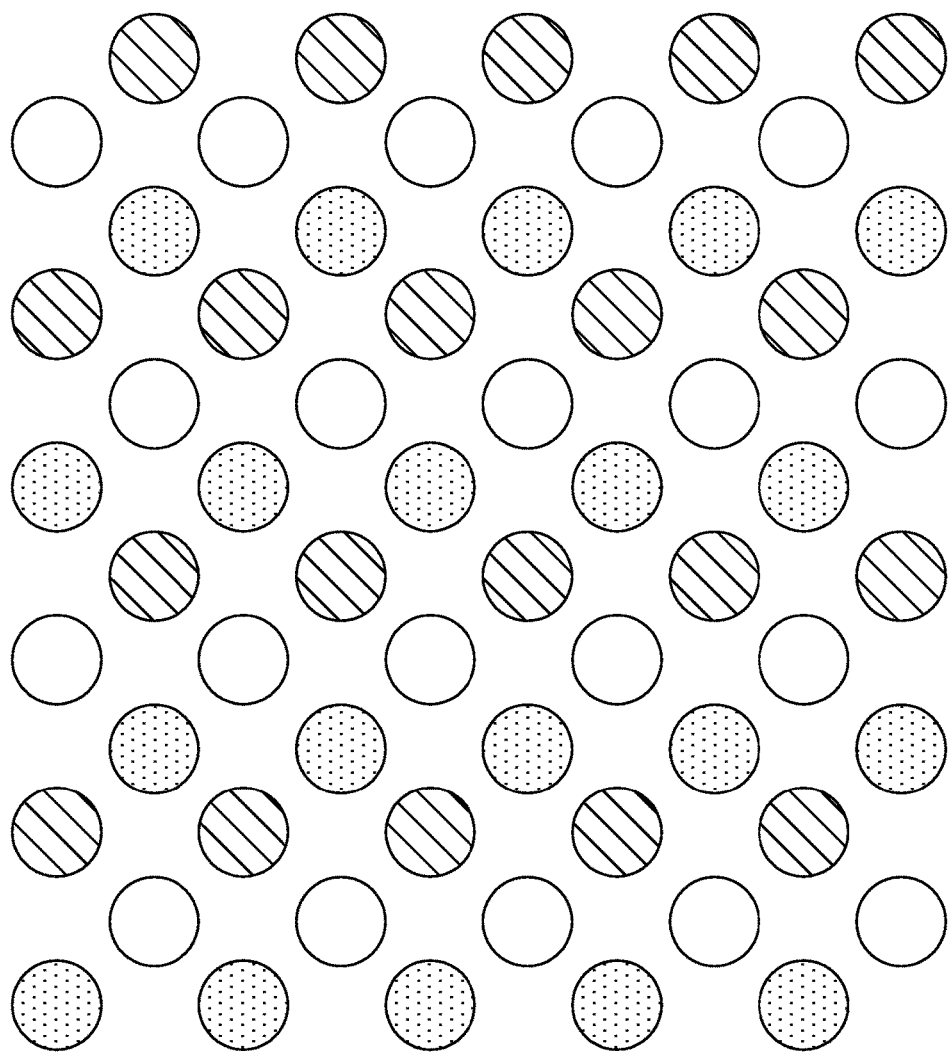
FIG. 5 illustrates an example mesh of overhead-mounted access points.
Figure 5:
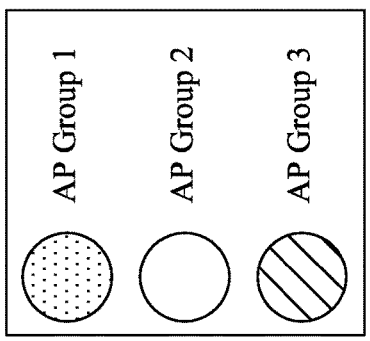

FIG. 5 illustrates an example mesh 500 of overhead-mounted access points (e.g., APs 412), according to various embodiments. In some embodiments, the controller for the mesh (e.g., controller 416) may subdivide the APs in the mesh into different groups, each of which is assigned to a different channel or channel hopping schedule. For instance, mesh 500 may be divided into three different subsets/AP groups, each of which operates on a different channel at any given time. Of course, any number of different AP groups and wireless channels could be used, as desired.

In a further embodiment, the different APs, or different radiators/antennas of a certain AP, in any given group may also be assigned to different time slices in their communication schedules, as well. For instance, assume that four of the circles shown in FIG. 5 belonging to AP group 1 are all controlled by a singular AP having four directional antennas. In such a case, the communication schedule may assign each antenna to a different time slice and the AP may rotate its transmissions across its four antennas, only transmitting on one of them at any given time.

To ensure that any given client device is able to reach at least one of its corresponding APs in mesh 500 during any transmission, the APs in any given group may be physically spaced such that at least one of them will always fall within the diameter of the beam cone of the client device (e.g., diameter d shown in FIG. 4A). In addition, since the wireless network is associationless, this means that a roaming operation does not need to be performed when the client device moves out of the range of one AP and into the range of another AP, as the APs are all functionally equivalent relays for the client device.

Further considerations for the physical layout of 500 may also take into account the communication schedules and channel groupings of the APs. For instance, let D1 represent the distance between APs in the same subset/group that belong to different time slices, meaning that they do not transmit at the same time on the same channel. In addition, let D2 represent the distance between APs of the same subset/group that belong to the same time slice, meaning that they do transmit on the same channel at the same time. In various embodiments, mesh 500 may be deployed such that the following condition is satisfied:

$$D1 < d < D2$$

where d is the diameter of the beam cone of a client device at the height of the ceiling, mesh 500, etc. and/or the diameter of the beam cone of an AP at the floor of the area, at the height of any receiver of a client device, etc. In doing so, this ensures that the client device is able to communicate with at least one AP in mesh 500 on its channel and during its assigned time slice, but not any interfering ones.

The physical sizes of the client devices and their scheduled movements may also be such that the number of client devices in any given downward cone from an AP is limited (e.g., only one client device is physically able to fit within the diameter d' of the beam cone of a given AP). In some embodiments, the communication schedules of the APs and client devices may be such that the client devices transmit at the same time and the APs transmit together, as well. The result is that the energy leaking from any client device will not affect any other nearby client device, since they are not receiving at that time. Note that, in some instances, there may be some reflection of a signal by either the ground or ceiling. However, the client device may act as a shield against such reflections in the downward case. In addition, any reflections will be further attenuated by distance, coating, irregularities on the surface that make the inference dependent on the location, or the like. Movement of a client device can also help to eliminate this issue. Regardless, any unwanted signals due to reflection can be eliminated (e.g., by the receiving device) by filtering the received transmissions by their power level diversity.

While the above techniques are described primarily with respect to radio frequency (RF) transmissions, a variation of the techniques herein would be to leverage Li-Fi for at least a portion of the wireless transmissions. As would be appreciated, Li-Fi is another wireless communication approach that uses visible light, ultraviolet, and/or infrared light to convey messages, wirelessly. This option may be preferable to using RF in instances such as warehouses with tight corridors that limit the window of a client device to the overhead mesh. In addition, using Li-Fi can also avoid having to filter transmissions that result from RF echoing off metallic structures.

Thus, in some embodiments, the APs of mesh 500 may take the form of Li-Fi transmitters or transceivers that use light emitters, rather than directional RF antennas, to send data to the client devices. Similar to the RF case above, the APs may also be subdivided and assigned to groups that communicate using different wavelengths (e.g., light-based channels). In some embodiments, the client devices may also be equipped with tracking systems that identify the source of a Li-Fi transmission so that it can direct its own transmissions upward towards that AP.

In further embodiments, both Li-Fi and RF can be used in concert with one another, providing additional redundancy to ensure communication at all times. In this case, different modes of operation are then possible, in various embodiments:

Both Li-Fi and RF are used at all times.

The APs of mesh 500 use Li-Fi or RF in an alternating fashion, according to some communication schedule (e.g., similar to a chess board configuration, etc.).

The APs of mesh 500 use Li-Fi by default and resort to using RF in the case of failures, only.

In all of the above cases, the combination of RF and Li-Fi allows also for full-duplex communications between a client device and an AP. For instance, light may be used for the downlinks from an AP to a client device and radio may be used for the uplink from the client device to the AP at the same time, without interfering with one another.

As a result of the above techniques, multiple APs may receive and relay the same frame transmitted by a client device. To provide such global coverage of the area without creating interference conditions, the transmitters/antennas of the APs may be physically spread out in an interleaved pattern across APs that operate on different channels, according to a time-sliced communication scheduling mechanism. Such scheduling may cause the APs to rotate among their transmitters on the same channel (e.g., those of APs belonging to the same AP group) such that any two of them are distant enough so as to not interfere with one another at the same time. This increases the density of the antennas and allows for global coverage for each wireless channel.

Figure 6:
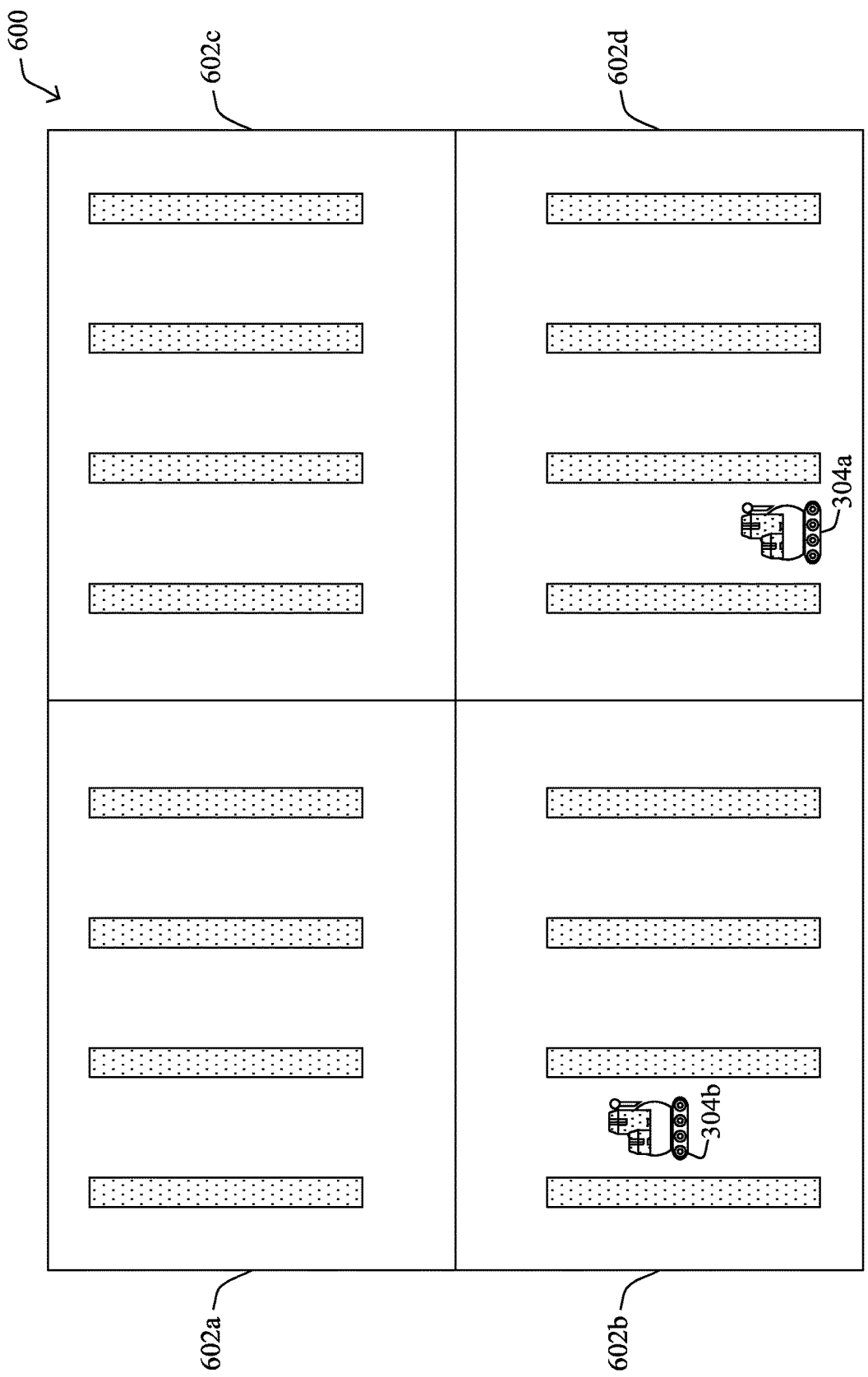
FIG. 6 illustrates an example of assigning area-dependent communication schedules to client devices.

FIG. 6 illustrates an example of assigning area-dependent communication schedules to client devices, according to various embodiments. Continuing the example of FIG. 3, again assume that there are mobile robots 304 that move throughout warehouse 300. Assume further that there is an overhead mesh of access points in warehouse 300, such as mesh 500. Accordingly, each mobile robot 304 may act as a client device with respect to the overhead mesh and may, using the techniques herein, do so in an associationless manner.

According to various embodiments, warehouse 300 may be subdivided into various physical areas 602a-602d, each of which may have a set of one or more TSCH schedules assigned to it for use by client devices. Such area-dependent schedules may be either preconfigured at a client device or pushed to a client device by a controller of the overhead mesh, either on demand (e.g., when a client device enters a new area) or pushed to the client device (e.g., periodically, etc.). For instance, when mobile robot 304a enters area 602d, it may obtain a particular communication schedule for use in that area.

Note that the area-dependence of the communication schedules may also be a function of the physical layout of the areas. For instance, areas 602a-602d may be defined according to the various pathways, obstacles, items being stored, etc. of warehouse 300. In further embodiments, the different areas may even be divided such that they are in different buildings, on different floors of a building, or the like.

In various embodiments, a key aspect of the area-dependent communication schedules used by the client devices of the overhead mesh is that they are such that they are non-overlapping with respect to those of other client devices in that area. This can be achieved in either of the following ways, according to various embodiments:

The slots of a given schedule are entirely exclusive to a particular client device in an area.
The slots of a given schedule only partially overlap those of other client devices in the area. In this case, partial overlaps may be allowed such that it would require a certain threshold of neighboring devices in the same area (e.g., 2-3, etc.) to fully obscure that of a particular client device in the area. If that client device retries several times, even a partial overlap with one neighbor will not totally block its communications with the overhead mesh.

In some embodiments, all of the communication schedules of the client devices in warehouse 300 may be maintained centrally, such as in a global database accessible by the controller of the overhead mesh. Assignments of the schedules could then be achieved by having the client devices publish their navigation schedules to this database, similar to how airplane flight plans are pre-scheduled. Such navigation schedules may be computed locally by the client devices, as in the (semi-)autonomous case, or by a supervisory service overseeing their movements. In turn, the next navigation schedule for a client device may be computed to take into account those of the other client devices, so as to avoid the path of any other client devices having schedules that could cause interference. For instance, assume that mobile robot 304a and mobile robot 304b share the same communication schedules, but in different areas 602d and 602b, respectively. In such a case, the navigation schedule for mobile robot 304a may be computed to follow a path in area 602d that avoid it coming too close to mobile robot 304b and interacting with the same AP(s) of the mesh as it, at the same time.

In another embodiment, an AP in the mesh may use a communication schedule that is orthogonal with that of its neighbors, and gives a subset of that schedule to the cart, based on the needs of the client device (e.g., its navigation pattern). This can be done dynamically so as to adapt to the needs of a client device, but would also require additional signaling to achieve. For instance, the client device and an AP may utilize an extension of Wi-Fi 6 or a custom protocol, to facilitate the client device requesting and giving back a portion of the AP's schedule.

Figure 7:
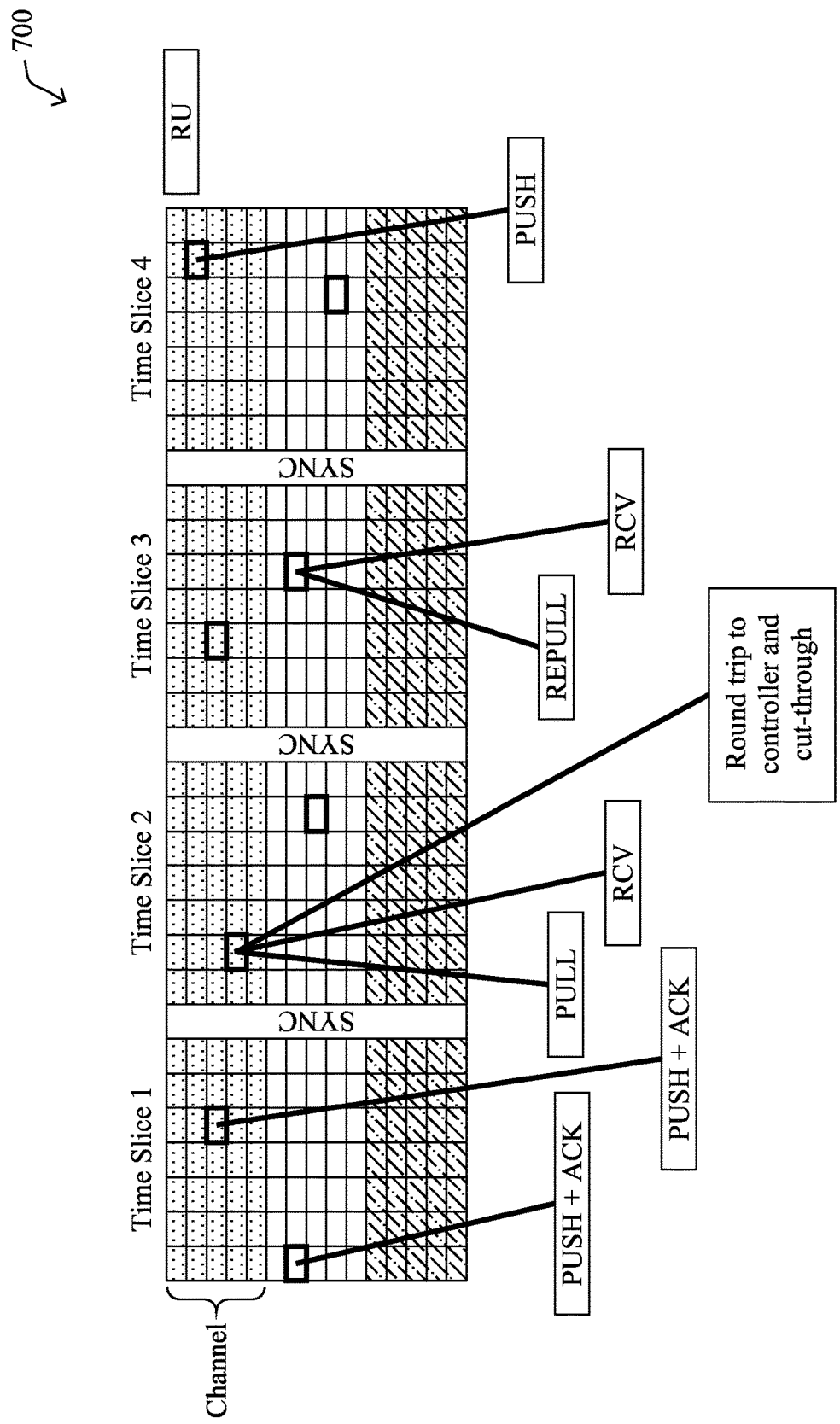
FIG. 7 illustrates an example area-dependent communication schedule.

FIG. 7 illustrates an example area-dependent communication schedule 700, according to various embodiments. As shown, communication schedule 700 may be a TSCH schedule that spans the channels of any or all of the AP groups of the overhead mesh. In addition, communication schedule 700 may be area-dependent, meaning that it may only be used by one client device in its designated area, either in a fully exclusive or partially-overlapping manner.

In various embodiments, communication schedule 700 may also be client-controlled in that its assigned client device may have control over whether any arbitrary slot in communication schedule 700 should be used for an uplink to the overhead mesh or a downlink from the overhead mesh. In other words, the client device 'owns' the slots in its schedule and makes the pull/push decisions for its slots, deciding whether to send/push a packet towards the mesh or pull packets from the mesh during any given slot.

For uplink transmissions, the client device that owns communication schedule 700 may select any given slot in it and send/push a message to the mesh by transmitting that message upward. Here, the client device may be unassociated with any given AP of the mesh and the transmission may be received and processed by whichever AP receives the transmission. Once received, that AP may send an acknowledgement (ack) downward to the client device during that slot, to confirm receipt. If the client device does not receive such an ack, it may opt to retransmit its message during another timeslot and/or at a different location.

Downlinks from the overhead mesh to the client device are also controlled by the client device, in some embodiments. Here, during any arbitrary slot of communication schedule 700 selected by the client device, it may send a pull request upward towards the overhead mesh. As with the uplink case, the client device is unaware of which AP(s) actually capture its packets, making the entire process associationless. Doing so also allows for natural replication, such as when multiple APs receive a pull request from the client device or are used to send packets to the client device.

In response to receiving a pull request during a particular slot of communication schedule 700, the receiving AP may send one or more packets destined for the client device to it. This can be achieved in a number of different ways, in various embodiments. In one embodiment, the AP(s) that receive a pull request from the client device may retrieve queued packets destined for the client device from the controller of the mesh. The controller may also select the best AP(s) to send those packets down to the client device, such as based on the signal quality, usage of nearby APs on the frequency, etc. The controller may then use those selected AP(s) to send the packets down to the client device. Of course, if there are no packets to be sent to the client device, the controller may instead push a NACK message back to the client device, indicating that there are no messages awaiting sending. If the client device does not receive such a NACK or a downlink packet, it may retry to pull packets from the overhead mesh at a different time and/or location.

Note that the round trip time to the controller and back should be such it fits within a single slot of communication schedule 700. Such a round trip, though, adds latency to the entire downlink process. Accordingly, in some embodiments, the sending AP(s) may cut-through the packet from the controller to be sent. In other words, it may begin forwarding the bytes of the packet to the client device on receipt from the controller.

In another embodiment, the downlink latency can also be addressed by having the controller precache any packets destined for the client device in one or more APs of the overhead mesh. This can be done, for instance, if the controller expects another request from the client device before it moves. In other cases, the controller may also take into account the navigation schedule of the client device, if known, to precache packets at any APs that will be overhead of the client device at a certain time.

FIG. 8 illustrates an example 800 of area-dependent communication schedules for a particular area, according to various embodiments. To illustrate the teachings herein, each communication schedule (e.g., schedule 700, etc.) may be thought of as being of a certain color. For instance, say there are three communication schedules for a given area: a 'yellow' schedule, a 'purple' schedule, and an 'orange' schedule, each of which is assigned to a different client device. Such schedules can be reused, in some instances, if their assigned client devices will always be far enough away from one another so as not to interfere with one another. In the context of the techniques herein, this can be done by ensuring that client devices with the same 'color' schedules never come near one another.

In some instances, the density of APs serving a particular schedule color could also be augmented by using tighter beams and more overhead APs, all the way to using Li-Fi instead of Wi-Fi in very dense and fast use cases.

As shown, the differently colored communication schedules may be configured such that any given schedule allows its client device to communicate with one of the AP groups 802 at a certain time 804. As a reminder, each AP group may comprise any number of APs in the overhead mesh on the same wireless channel. Thus, during time T1, the client device in the area having the yellow communication schedule may communicate with an AP in AP group 1 on a first channel, the client device in the area having the purple communication schedule may communicate with an AP in AP group 2 on a second channel, and/or the client device in the area having the orange communication schedule may communicate with an AP in AP group 3 on a third channel. During time T2, the client devices and their schedules may then rotate AP groups 802, with the client device having the yellow schedule now being able to communicate with an AP in AP group 2, etc.

Note that a client device may be provisioned with a communication schedule of a different color any time it is predicted that it will come within proximity of another client device having a schedule of the same color. In normal operations, diverse travel schedules or some alternate method of distance control may ensure that two client devices having the same color schedule will never communicate with the same AP.

However, if any do end up having an AP in common, the controller could also avoid using that one to transmit to either of the client devices.

Figure 9:
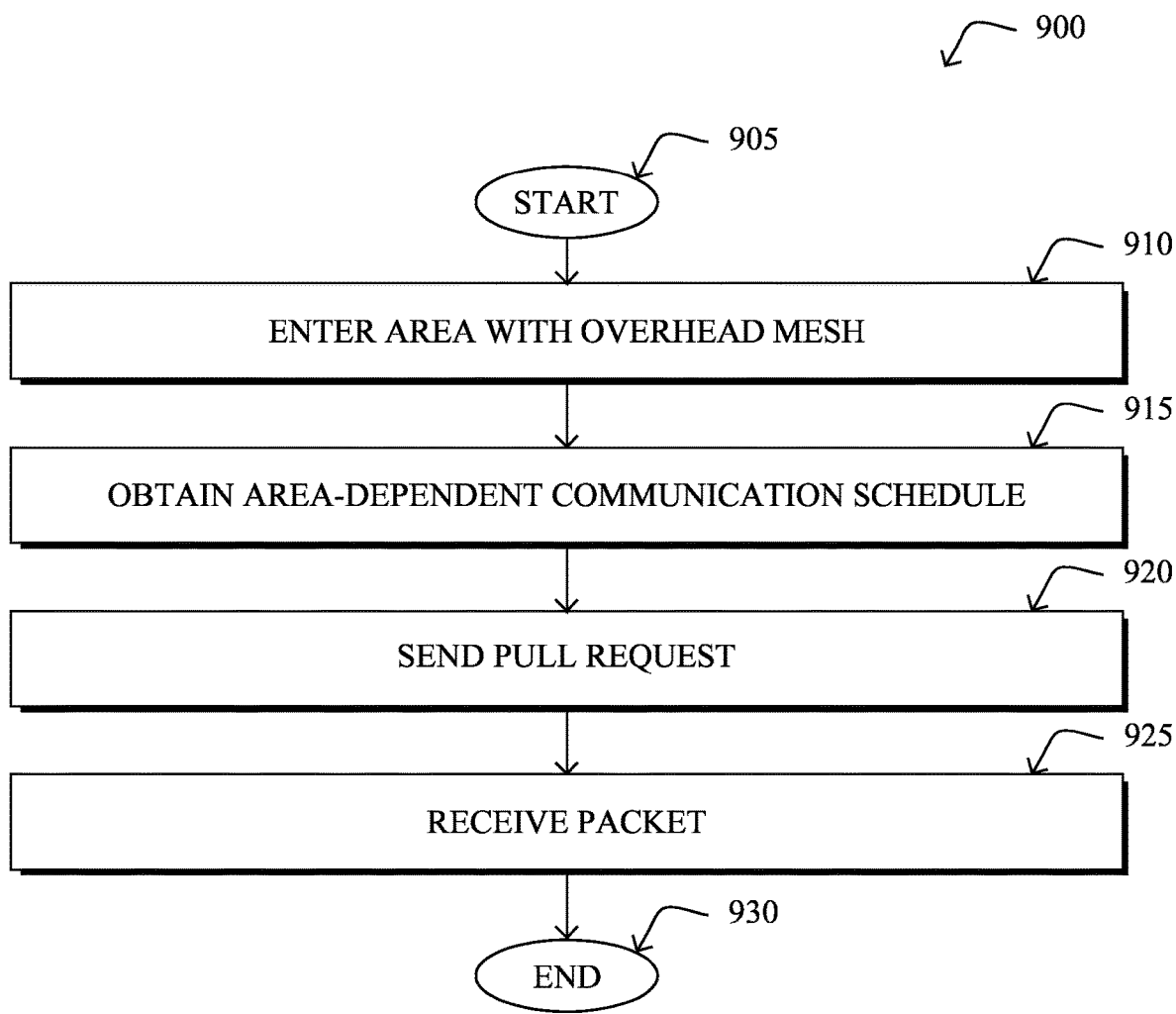
FIG. 9 illustrates an example simplified procedure for client-controlled communication scheduling with an overhead mesh of access points.

FIG. 9 illustrates an example simplified procedure for scheduling communications in an overhead mesh of access points, in accordance with one or more embodiments described herein. The procedure 900 may start at step 905, and continues to step 910, where, as described in greater detail above, a client device (e.g., device 200) may enter an area having an overhead mesh of access points. In various embodiments, each access point may include one or more directional transmitters each configured to transmit a beam cone in a substantially downward direction towards a floor of the area. In some embodiments, the client device may retrieve a navigation schedule for a second client device having a same communication schedule as that of the client device. In turn, the client device may navigate along a path in the area such that the client device and the second client device do not interact with a same access point.

At step 915, as detailed above, the client device may obtain an area-dependent communication schedule for the overhead mesh that is exclusive or partially-exclusive to the client device for the area. In some embodiments, the client device may do so by interacting with the overhead mesh. For instance, a controller for the overhead mesh may designate a particular communication schedule for the client device, based on the area that it is in. In other embodiments, the client device may have been preprogrammed with the area-dependent communication schedule and retrieve it from memory, when it enters the area. In one embodiment, the area-dependent communication schedule is partially-exclusive to the client device in the area such that it only partially overlaps that of another client device in the area. In a further embodiment, the area-dependent communication schedule is fully exclusive to the client device in the area such that it does not overlap that of any other client devices in the area. In another embodiment, the client device replaces an existing communication schedule for another area with the area-dependent communication schedule when entering the area.

At step 920, the client device may send, during an arbitrary timeslot of the area-dependent communication schedule, a pull request, as described in greater detail above. In other words, the communication schedule may be client-controlled, allowing the client device to decide when it wishes to receive messages from the overhead mesh. In various embodiments, the client device may determine that the arbitrary timeslot should be used for a downlink with the overhead mesh. In some embodiments, the client device may also designate a particular slot of the area-dependent communication schedule for uplink to the overhead mesh and send a transmission towards the overhead mesh, without first performing an association exchange with any access point that receives that transmission.

A step 925, as detailed above, the client device may receive, from a particular access point in the overhead mesh, a packet in response to the pull request. In various embodiments, the client device receives the packet from the particular access point without first performing an association exchange with that access point. In other words, the client device may be associationless with respect to the APs of the overhead mesh. In one embodiment, the particular access point and one or more other access points in the overhead mesh cache the packet, in advance of the client device sending the pull request. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein introduce wireless communication approaches that avoid the need of a client device to associate with an access point, so that it can simply transmit to any access point in its range at any given time. In further aspects, the techniques herein also ensure that all the channels can be used in all locations so that a client device can transmit on any channel without failure. The techniques herein also ensure that only one access point is able to transmit to a given location at any given time, so that there is no interference from other access points from the perspective of the client device. In addition, transmissions by a client device can also be received by multiple access points in the mesh, for purposes of redundancy and reliability.

While there have been shown and described illustrative embodiments for client-controlled communication scheduling with an overhead mesh of access points, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed in certain settings, such as a factory or warehouse, the techniques are not limited as such and can be deployed in any number of different settings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   entering, by a client device, an area having an overhead mesh of access points, each access point comprising one or more directional transmitters each configured to transmit a beam cone in a substantially downward direction towards a floor of the area;
   obtaining, by the client device, an area-dependent communication schedule for the overhead mesh that is exclusive or partially-exclusive to the client device for the area;
   sending, by the client device and during an arbitrary timeslot of the area-dependent communication schedule, a pull request; and
   receiving, at the client device and from a particular access point in the overhead mesh, a packet in response to the pull request.

2. The method as in claim 1, wherein the client device receives the packet from the particular access point without first performing an association exchange with that access point.

3. The method as in claim 1, further comprising:
   retrieving, by the client device, a navigation schedule for a second client device having a same communication schedule as that of the client device; and
   navigating, by the client device, along a path in the area such that the client device and the second client device do not interact with a same access point.

4. The method as in claim 1, wherein the area-dependent communication schedule is partially-exclusive to the client device in the area such that it only partially overlaps that of another client device in the area.

5. The method as in claim 1, further comprising:
   determining, by the client device, that the arbitrary timeslot should be used for a downlink with the overhead mesh.

6. The method as in claim 1, wherein the particular access point and one or more other access points in the overhead mesh cache the packet, in advance of the client device sending the pull request.

7. The method as in claim 1, wherein the particular access point begins forwarding bytes of the packet to the client device on receipt of the bytes from a controller for the overhead mesh.

8. The method as in claim 1, further comprising:
   designating, by the client device, a particular slot of the area-dependent communication schedule for uplink to the overhead mesh; and
   sending, by the client device, a transmission towards the overhead mesh, without first performing an association exchange with any access point that receives that transmission.

9. The method as in claim 1, wherein the client device replaces an existing communication schedule for another area with the area-dependent communication schedule when entering the area.

10. The method as in claim 1, wherein the area-dependent communication schedule is fully exclusive to the client device in the area such that it does not overlap that of any other client devices in the area.

11. An apparatus, comprising:
    one or more network interfaces;
    a processor coupled to the one or more network interfaces and configured to execute one or more processes; and
    a memory configured to store a process that is executable by the processor, the process when executed configured to:
      enter an area having an overhead mesh of access points, each access point comprising one or more directional transmitters each configured to transmit a beam cone in a substantially downward direction towards a floor of the area;
      obtain an area-dependent communication schedule for the overhead mesh that is exclusive or partially-exclusive to the apparatus for the area;
      send, during an arbitrary timeslot of the area-dependent communication schedule, a pull request; and
      receive, from a particular access point in the overhead mesh, a packet in response to the pull request.

12. The apparatus as in claim 11, wherein the apparatus receives the packet from the particular access point without first performing an association exchange with that access point.

13. The apparatus as in claim 11, wherein the process when executed is further configured to:
    retrieve a navigation schedule for a second apparatus having a same communication schedule as that of the apparatus; and
    navigate along a path in the area such that the apparatus and the second apparatus do not interact with a same access point.

14. The apparatus as in claim 11, wherein the area-dependent communication schedule is partially-exclusive to the apparatus in the area such that it only partially overlaps that of another apparatus in the area.

15. The apparatus as in claim 11, wherein the process when executed is further configured to:
    determine that the arbitrary timeslot should be used for a downlink with the overhead mesh.

16. The apparatus as in claim 11, wherein the particular access point and one or more other access points in the overhead mesh cache the packet, in advance of the apparatus sending the pull request.

17. The apparatus as in claim 11, wherein the particular access point begins forwarding bytes of the packet to the apparatus on receipt of the bytes from a controller for the overhead mesh.

18. The apparatus as in claim 11, wherein the process when executed is further configured to:
    designate a particular slot of the area-dependent communication schedule for uplink to the overhead mesh; and
    send a transmission towards the overhead mesh, without first performing an association exchange with any access point that receives that transmission.

19. The apparatus as in claim 11, wherein the apparatus replaces an existing communication schedule for another area with the area-dependent communication schedule when entering the area.

20. A tangible, non-transitory, computer-readable medium storing program instructions that cause a client device to execute a process comprising:
    entering, by the client device, an area having an overhead mesh of access points, each access point comprising one or more directional transmitters each configured to transmit a beam cone in a substantially downward direction towards a floor of the area;
    obtaining, by the client device, an area-dependent communication schedule for the overhead mesh that is exclusive or partially-exclusive to the client device for the area;
    sending, by the client device and during an arbitrary timeslot of the area-dependent communication schedule, a pull request; and
    receiving, at the client device and from a particular access point in the overhead mesh, a packet in response to the pull request.

\* \* \* \* \*

UNITED STATES PATENT AND TRADEMARK OFFICE
CERTIFICATE OF CORRECTION

PATENT NO. : 12,069,659 B2
APPLICATION NO. : 17/581136
DATED : August 20, 2024
INVENTOR(S) : Pascal Thubert et al.

It is certified that error appears in the above-identified patent and that said Letters Patent is hereby corrected as shown below:

In the Specification

Column 5, Line 52 please amend as shown:
deployed, such as mobile robots 302*a*-304*l* shown. In Column 7, Line 50 please amend as shown:
To prevent energy leakage between cones (e.g., between Column 8, Line 22 please amend as shown:
mine which AP is the 'best' in terms of signal strength/

Column 8, Line 66 please amend as shown:
message without specifying a source and destination Signed and Sealed this
Nineteenth Day of August, 2025

Coke Morgan Stewart
*Acting Director of the United States Patent and Trademark Office*